June 27, 1950 R. J. DIPPY 2,512,923
CATHODE-RAY OSCILLOGRAPH DEVICE
Original Filed March 17, 1944 3 Sheets-Sheet 2

Inventor
Robert James Dippy
By
Cameron Kerkam & Sutton
Attorneys

June 27, 1950   R. J. DIPPY   2,512,923
CATHODE-RAY OSCILLOGRAPH DEVICE
Original Filed March 17, 1944   3 Sheets-Sheet 3
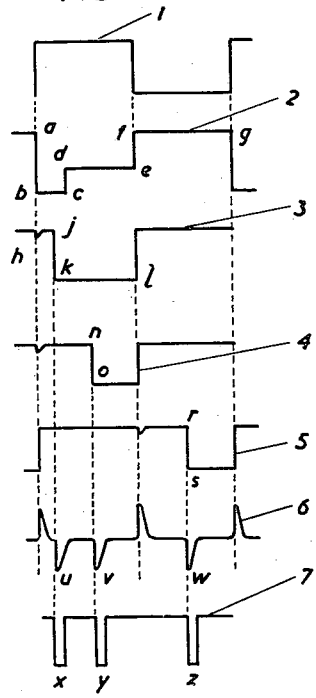
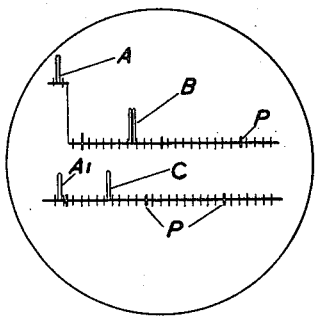
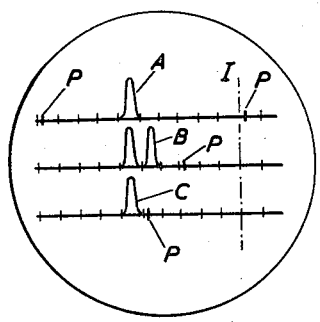
Inventor
Robert James Dippy
By
Cameron, Kerkam + Sutton
Attorneys Patented June 27, 1950

2,512,923

UNITED STATES PATENT OFFICE 2,512,923

CATHODE-RAY OSCILLOGRAPH DEVICE

Robert James Dippy, Old Bexley, England

Original application March 17, 1944, Serial No. 527,018. Divided and this application July 18, 1947, Serial No. 761,967. In Great Britain December 23, 1942

Section 1, Public Law 690, August 8, 1946
Patent expires December 23, 1962

14 Claims. (Cl. 315—22)

This invention relates to cathode ray oscillograph devices and is more particularly concerned with such devices employing a repetitive time-base operating to display a repetitive applied signal input which represents the subject under investigation.

One object of the invention is to provide an arrangement permitting the examination of one or more selected portions of the main or principal display on the oscillograph screen at a magnified time-base writing speed.

Another object of the invention is to provide an arrangement in which a single cathode ray tube may be used to display a large section of the repetitive signal input or alternatively to display, to a magnified scale, any selected smaller portion of said larger display.

Another object of the invention is to provide an arrangement by which a marking indication is given on the main display and is adjustable in position therealong and in which an alternative higher speed and therefore magnified time scale display may be provided of the marked portions of said main display.

A further object of the invention is to provide an arrangement in which time marking or calibration signals are provided on the main display for assessment of the time period of any occurrence indicated by the display and by which the same time marking signals are also available on a higher speed time-base delay of a selected portion of said main display.

A further object of the invention is to provide an arrangement particularly suitable for use in wireless systems for the navigation of a mobile craft as described in my co-pending application Serial No. 527,018 from which this present application forms a divisional application.

In order that the invention may be more clearly understood one embodiment thereof, as applied to the wireless navigation system described in my co-pending application Serial No. 527,018 from which the present application forms a divisional application, will now be described by way of example with reference to the accompanying drawings in which—

Figure 3 illustrates certain operating potential wave-forms encountered in the circuit diagram of Figure 2 and Figures 4 and 5 show the appearance of the input signals and marking indications on the indicator tube in the initial setting and higher speed time-base conditions respectively.

In my aforesaid copending application Serial No. 527,018 there is described a wireless navigation system in which a fixed position main transmitter, referred to as the A station radiates a succession of pulse signals at constant time-intervals and in which two distant fixed position "satellite" stations, referred to as the B and C stations respectively, are controlled by such pulse signals whereby they in turn radiate further "counterpart" pulses at predetermined time-intervals after those of the main station. As a result of such arrangement there will exist, in the space around the group of transmitters, a series of positions where the time-intervals between pulse signals from the main station and the "counterpart" signals from the two "satellite" stations have a particular and constant value, by providing a mobile craft, such as an aircraft, with means for measuring these time-intervals it is possible for the operator at such craft to plot his position, and, if necessary, to navigate towards any desired destination.

Figure 1:
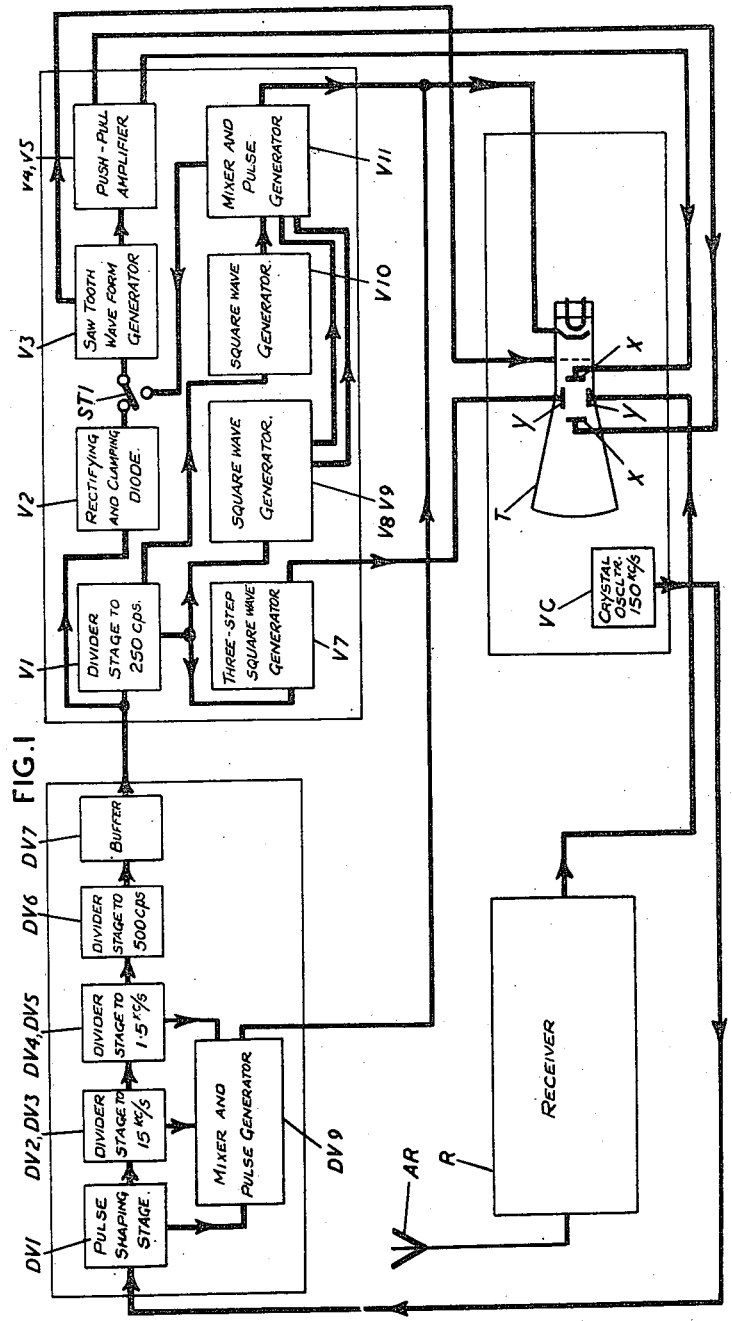
Figure 1 is a block diagram illustrating the main elements of a receiver as used in the aforesaid copending application Serial No. 527,018 and comprising a cathode ray oscillograph device according to the present invention.

Referring now to Figure 1 of the drawings, incoming signals at the mobile craft are fed from an aerial AR to a receiver R from which they are passed directly to one of the vertical deflecting plates $y$ of a cathode-ray indicator tube T, where they cause a vertical displacement of the tube beam whenever signals occur.

A crystal oscillator VC provides an output at 150 kc./s., which is fed to a series of divider stages DV1 ... DV7 where frequency reduction to 500 C. P. S. is effected. The 500 C. P. S. output from DV7 is applied through a diode V2 to a switch ST1 by which it can be fed to a saw-tooth waveform generator V3 whose output is passed by way of push-pull amplifiers V4, V5 to the horizontal deflecting plates $x$ of the indicator tube T, to cause horizontal scanning of the tube beam at 500 times per second.

The 500 C. P. S. output from divider stage DV7 is also applied to a further frequency divider stage V1 which provides two output square-waveforms, each of 250 C. P. S. but with one phase displaced by 180 degrees, with respect to the other. One of these 250 C. P. S. square-waveforms is applied to valve stages V7, V8 and V9 and the other to valve stage V10. Valve stage V7 is arranged, in a manner described in detail later, to develop a three-step voltage output wave-form which is applied to the vertical deflecting plate $y$ of the indicator tube T, opposite to that supplied with input signals from receiver R, to cause vertical displacement of the traces by the tube beam. Two of these voltage steps occur during the first-cycle of the 250 C. P. S. input waveform and the third during the second half cycle. As horizontal scans are being provided by the generator V3, one during each half-cycle of the 250 C. P. S. input to valve stage V7, the resultant display upon the screen of the indicator tube T is a stepped upper trace and a further unstepped lower trace parallel therewith as shown in Figure 4. Upon these traces the incoming signals appear as vertical deflections in the manner also shown in Figure 4.

The crystal oscillator VC is stabilized at its frequency of 150 kc./s., i. e. the same frequency as the master control oscillator of the A station described in my copending application Serial No. 527,017, and so serves as a synchronising medium between the pulse-recurrence frequency of the fixed transmitting stations and the scanning frequency of the present apparatus whereby a stationary or substantially stationary presentation of the received signals is provided by successive traces on the indicator tube T. A small degree of manual control of the frequency of the oscillator VC is desirable to allow for compensation of any slight change that may take place in either oscillator and also to provide means whereby an intentional drift may be imparted to the position of the received signals upon the traces of the indicator tube T in order to bring such signals to particular positions most convenient for measurement purposes.

Measurement of the spacing and hence the time intervals between the various received signals is effected by means of timing or calibration marks at regular time-intervals along each trace. For this purpose the 150 kc./s. output from the oscillator VC is taken in sharpened pulse form from a suitable point of the circuit of the divider stage DV1 through valve stage DV9 to the cathode of the indicator tube T to cause a series of brightened spots at intervals of 1/150000 sec. To facilitate counting, these are divided into groups of 10 and 100 by means of further marks derived from a 15 kc./s. output taken from divider stage DV2, DV3, and from a 1.5 kc./s. output taken from divider stage DV5. These output are fed through valve stage DV9 to the cathode of the indicator tube as with the 150 kc./s. time-markers and appear as additional brightened spots P (shown more clearly in Figure 5) immediately behind each tenth mark of the next smaller subdivision. In Figs. 4 and 5 of the drawings these brightened spots P are shown, for the purpose of illustration only, as vertical lines in view of the impossibility of depicting the variation of light intensity which occurs in actual practice. In practice with the main time-base display as shown in Figure 4 the 150 kc./s. time-markers would be too close-spaced to be distinguishable and are therefore not supplied, only the 15 kc./s. time-markers, divided into groups of ten by the 1.5 kc./s. time-marker appearing. On the high-speed time-bases described later, the 150 kc./s. time-markers appear as unit intervals sub-dividing the spaces formed by the 15 kc./s. time-markers as shown in Figure 5.

Valve stages V8, V9 and V10 are arranged in conjunction with valve stage V11 which they feed, to provide an output waveform from the latter comprising three negative-going square-shaped pulses repeated at 250 C. P. S. As described in detail later these pulses may be adjusted as to their respective timing positions and by application to the cathode of the indicator tube T cause further brightening of selected short portions of the traces, hereinafter referred to as "strobe" marker portions. The same three-pulse waveform output from V11 is connected to switch ST1 and may be used instead of the 500 C. P. S. output from divider DV7 to trigger the saw-tooth generator V3 and hence to provide three (high speed) scans corresponding in time to those "strobe" marker portions of the main trace selected by adjustment of timing of the aforesaid three negative-going pulses. As both the received signals and the vertical shift voltages from valve V7 continue to be applied to the indicator tube the resultant display is one of three parallel scans as shown in Figure 5, providing in greatly magnified form the three selected "strobe" marker portions of the main trace shown in Figure 4.

Impulses from the generator V3 are applied to the control grid of the indicator tube T to suppress the return stroke of the saw-tooth waveform providing the time-base scan in each case.

The signal receiver circuit R is preferably of the superheterodyne type and may take any convenient standard form. Similarly, the frequency dividing circuits DV1 ... DV7 and master crystal oscillator circuit VC may be of any known convenient type.

The circuits for producing the required "strobe" marker portions of the time-base may conveniently make use of the known properties of a pentode valve arranged as a "transitron flip-flop" oscillator, i. e. having a negative mutual conductance characteristic between its suppressor and screen grids. If such a valve is initially biassed to cut off at its control grid and is then triggered by an applied pulse the anode and screen grid voltages alternate between clear cut values, the duration of the cycle being controlled by the time constant of the feed-back coupling capacity between screen and suppressor grids and an associated leak-resistance.

Figure 2:
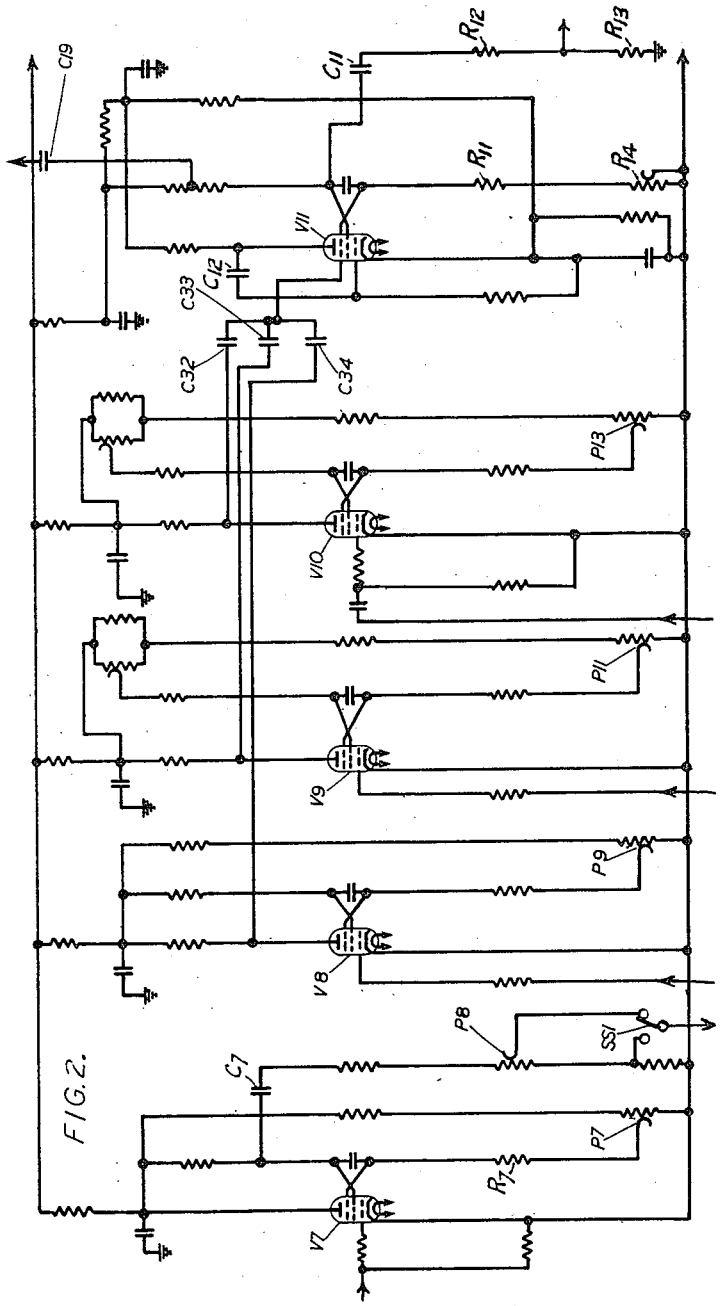
Figure 2 is a circuit diagram showing one arrangement for developing a plurality of marking signals by which marking indications may be provided and by which the higher speed time-bases may be controlled.

Referring now to Figure 2, which shows a suitable circuit, a 250 C. P. S. square wave output from the frequency divider stage V1 (Figure 1) and shown by the waveform 1, Figure 3, is applied to the control grid of a pentode valve V7. During each negative-going half-cycle of the applied wave-form, the valve V7 is cut off and in consequence both screen and anode potentials will be at a value approaching that of the HT+ supply line. Upon the arrival of a positive-going half-cycle of the applied waveform, space current will commence to flow and both screen and anode potentials will momentarily start to fall. Due, however, to the capacitive feed-back between screen and suppressor grids, the latter will itself be lowered in potential to divert space current from the anode to the screen grid with consequent increased fall of screen potential. This further fall is again fed back to the suppressor to cause, in known manner, a precipitate change to the condition where the screen is taking all the space current and the anode is cut off by the suppressor. As a result the anode potential is maintained at its previous high value while the screen potential falls rapidly as depicted in waveform 2 (Figure 3) by the portions $a$—$b$. The level $b$ is maintained until the suppressor grid potential rises, by discharge of the feed-back capacity through resistance R7 and potentiometer P7, to a value permitting anode current to flow. Immediately this takes place the diversion of space current to the anode causes a decrease of screen current with consequent rise of screen potential. This rise is fed back to the suppressor grid to cause further increase in anode current at the expense of the screen current and by a reversal of the process described above causes a precipitate change to the condition where the division of space current between anode and screen is determined by the standing potentials of the valve electrodes. This rise of screen potential is depicted by the portion c—d of waveform 2 (Figure 3). These conditions prevail over the period d—e of waveform 2 (Figure 3) until the valve is against cut off completely by arrival of the following negative-going half-cycle of the input wave whereupon the screen potential rises to its initial value and remains there throughout the negative-going half-cycle, i. e. over the period f—g of waveform 2 (Figure 3) until the arrival of the next positive-going half-cycle of the input waveform initiates a repetition of events as described.

The three voltage levels b—c, d—e and f—g constitute the necessary shift voltages for effecting vertical displacement of the trace upon the indicator tube T of Figure 1 and are accordingly fed to the appropriate plate y by way of the condenser C7, potentiometer P8 and switch SS1 when in the position shown in Figure 2.

In the arrangement described the potentiometer P7 controls the standing suppressor grid potential and the discharge time of the feedback capacity between screen and suppressor grids and therefore determines both the length and the level of the portion d—e of the waveform 2 (Fig. 3). Potentiometer P8 determines the proportion of the developed voltage changes actually applied as deflecting voltages to the indicator tube T and therefore controls the actual spacing between the traces.

With switch SS1 in the opposite position to that shown in Figure 2 potentiometer P8 is rendered inoperative and a different proportion of the developed voltage changes is applied to the indicator tube T. As this proportion will be less than any provided by setting of potentiometer P8, a closing up of the trace spacing will result for a purpose described later.

Since the input waveform to valve V7 is of 250 C. P. S. frequency whereas the saw-tooth voltages provided by generator V3 through push-pull amplifier V4, V5 (Figure 1) are at 500 C. P. S., it will be clear that the first or positive-going portion of waveform 1 (Figure 3) will correspond to one horizontal trace provided by V3 and the negative-going half-cycle of waveform 1 (Figure 3) to the following horizontal trace from V3. As a result the voltage levels bc, de of waveform 2 (Figure 3) will determine the relative lengths and vertical displacements of the top step and remainder of the first trace, whilst the voltage level fg determines the length and relative displacement of the second trace. With switch SS1 in the position shown in Figure 2 the resultant appearance at the indicator tube T will be as shown in Figure 4 while with the switch in the opposite position closing up of the trace levels occurs as shown in Figure 5.

The same 250 C. P. S. waveform 1 (Figure 3) is also applied to the control grid of a second pentode valve V8 arranged as a "transition flip-flop" oscillator in similar manner to V7, and accordingly there is produced at its anode, a potential waveform as shown at 3 (Figure 3). In this waveform the small pip h corresponds to the momentary drop in anode potential upon initial opening up of the valve by application of the positive-going half-cycle of the input waveform to its control grid and the level h—j to the immediately following period when the screen is taking all the space current. The sudden drop j—k is equivalent to the change c—d in waveform 2 (Figure 3) i. e. when anode current commences to flow, while the period k—l is equivalent to the portion d—e of waveform 2.

In this instance the instant of change j—k is controlled by the setting of potentiometer P9 in similar manner to the potentiometer P7 associated with valve V7, and can be arranged to take place at any instant over the time period of the level b—c of waveform 2 (Figure 3). The waveform 3 thus developed at the anode of V8 is fed by way of condenser C34 to the suppressor grid of a further pentode valve V11 to be described later.

The same 250 C. P. S. waveform 1 (Figure 3) is further applied to the control grid of a third pentode valve V9 arranged in similar manner to valve V8 and the waveform, shown at 4 (Figure 3) developed at its anode is applied by way of condenser C33 to the suppressor grid of valve V11. In this instance the instant of change n—o, equivalent to change j—k of waveform 3, is adjustable by potentiometer P11 to occur at any desired instant over the time period of the level d—e of waveform 2 (Figure 3).

To the control grid of pentode valve V10 is applied the 250 C. P. S. square waveform similar to that shown at 1 (Figure 3) but 180 degrees out of phase therewith. This is conveniently effected by deriving waveform 1 from the anode and this further waveform from the screen grid of a valve in the valve circuit V1. Valve 10 is arranged in similar manner to valves V8 and V9, and, accordingly there is developed at its anode a waveform as shown at 5 in Figure 3. In this instance, the instant of the sudden drop r—s, equivalent to the changes j—k and n—o of waveforms 3 and 4, is controlled by the setting of potentiometer P13 and due to the 180 degrees phase displacement of the input wave, occurs during the time of the level f—g of waveform 2 (Figure 3) i. e. during the time of the lowermost trace on the indicator tube T. The output waveform is fed from anode of C10 by way of condenser C32 to the suppressor grid of valve V11, in parallel with the outputs from valves V8 and V9.

Valve V11 is arranged as a "transitron flip-flop" oscillator in substantially similar manner to valves V7—V10 but, by suitable values of feed back capacities and associated leak resistances, is arranged to have a considerably shorter time cycle of operation. The duration of each time cycle is adjustable in similar manner to the earlier valve, by means of potentiometer P14.

The capacity of each condenser C32, C33 and C34 is so chosen, with respect to the leakage resistance path R11 and P14 therefor, that differentiation of the various input waveforms shown at 3, 4 and 5 (Figure 3) takes place with the result that the waveform 6 (Figure 3) is applied to the suppressor grid of V11. This waveform provides short positive-going pulses at the instants of positive-going swing of any of the anodes of valves V8, V9 or V10 and similar short negative-going pulses u, v and w (Figure 3 waveform 6) at each of the negative-going swings.

Each negative-going pulse $u$, $v$ and $w$ will operate to cut off anode current in the valve thereby increasing the screen current and lowering the screen potential and by a precipitate action similar to that previously described with relation to valve V7 will cause the generation at the screen of V11, of a negative-going square pulse for each negative-going input pulse, as shown at $x$, $y$ and $z$ of waveform 7 (Figure 3). The positive-going pulses of the input waveform 6 (Figure 3) are rendered ineffective by suitable arrangement of the standing potentials of the valve electrodes.

The waveform 7 (Figure 3) thus provided at the screen of V11 is fed from a potential divider network by way of condenser C19 to the cathode of the indicator tube T where it causes brightening of the traces at instants determined by the position of the negative-going portions $x$, $y$ and $z$ to form the afore-mentioned "strobe" marker portions. The portion $x$, occurring within the time of the length $b$—$c$ of waveform 2 will occur at an adjustable position along the stepped portion of the first trace, the second portion $y$, coming within the time of the length $d$—$e$ of waveform 2 will occur at an adjustable position along the remainder and central portion of the first trace while the portion $z$ occurring within the length $f$—$g$ of waveform 1 will occur at an adjustable point on the second and lowest trace. The lengths of the portions $x$, $y$ and $z$, which are adjustable as already described by means of potentiometer P14, determine the length of the brightened "strobe" marker portions of the trace.

The said waveform 7 (Figure 3) is also fed by way of condenser C11 and potential divider network R12, R13 to the switch ST1 of Figure 1 by means of which the said negative-going pulses $x$, $y$ and $z$ may be substituted for the 500 C. P. S. trigger voltages provided from the divider network DV1—DV17 through diode V2. Simultaneously with operation of switch ST1, the requisite component value alterations are made within the saw-tooth generator circuit V3 whereby a steeper-slope saw-tooth voltage of appropriate amplitude to span the indicator tube and commencing at the leading edge of the negative-going input, is developed for each of the negative pulses. In this way three higher-speed time-bases are substituted for the previous main time-base, each providing a greatly magnified version of the small portion of the main time-base selected by its associated "strobe" marker. As both input signals and the timing marks derived from the oscillator VC continue to be displayed in their correct relationship to one another, greatly increased accuracy of reading of the position of a signal with respect to the timing marks is possible. At the same time switch SS1 is altered to decrease the spacing between the traces and so facilitate reading by an alignment method described later.

The manner of operating the mobile craft apparatus is described in my copending application Serial No. 527,018 to which reference should be made. Briefly to obtain a fix the main trace as shown in Figure 4, is first put into use by operation of switches SS1 and ST1 and the received signals caused to drift along the traces by suitable adjustment of the oscillator VC to provide a horizontal scanning speed at a frequency slightly different from that of the pulses radiated by the fixed station A. This condition is maintained until the A and B station signals are on the top trace with the A station pulse located on the stepped portion as shown at A and B in Figure 4. This automatically places the further A and C station signals on the allotted lower trace as shown A and C in Figure 4. The oscillator VC is then adjusted to obtain synchronisms whereby the received signals remain stationary. A preliminary reading is then taken of the positions of the A, B and C signals with respect to the 15 kc./s. and 1.5 kc./s. timing marks visible, using the 15 kc./s. marks as unit intervals and the 1.5 kc./s marks to facilitate counting by grouping into 10's. For example in Figure 4 using the first 1.5 kc./s. mark as zero, the A reading will be between $-1$ and $-2$, the B reading between $+7$ and $+8$ and the C reading between $+35$ and $+36$ (the lower trace being regarded as a continuation of the upper).

The three "strobe" marker portions are now moved along the traces, by suitable adjustment of the potentiometers P9, P11 and P13 until they "straddle" the A, B and C signals respectively. Switches SS1 and ST1 are now operated to replace the main time-bases by the three high-speed time-bases corresponding to the three selected strobe-marked positions, as shown in Figure 5. The timing marks now visible are those at 150 kc./s. with, since the minimum length of the strobe marked portion is greater than one unit or 15 kc/s. interval, at least one of the 15 kc./s unit interval marks as shown at P. Accurate measurement is now possible with the aid of the sub-division of each unit interval into 10 parts by the 150 kc./s. marks; the readings shown in Figure 5 taking the leading edge of each signal as an index point are $A-.58$, $B+.72$, and $C+.92$, giving totals of $A-1.58$, $B+7.72$ and $C+35.92$. As described in greater detail in my aforesaid copending application Serial No. 527,018 the final delays-times of B and C with respect to A are therefore $B+9.30$ and $C+37.50$. By reference to a suitable lattice chart the craft position can now be found.

The above described manner of ascertaining the accurate decimal places of the time-intervals although illustrating the fundamental method may be shortened in practice by aligning the A, B and C signals as shown in Figure 5 by adjustment of the controls P9, P11 and P13 and then using the nearest 15 kc./s. mark on the A traces as an index mark as shown by the dotted line I in Figure 5 whereupon the final decimal figures may be read off directly by the projection of such mark upon the lower traces. A switch, not shown, may be provided to remove the signals from the traces while this is done.

The provision of the high-speed adjustable or "strobe" time-bases with the calibration of time-markers superimposed thereon in conjunction with the above alignment method nullified the effect of any slight drift in the frequency of the crystal controlled oscillator since, once the signal pulses have been aligned on the "strobe" time-bases, any subsequent drift in the frequency of the crystal controlled oscillator simply causes all three pulses to float uniformly across the screen, without losing their mutual alignment or altering the relative positioning of the stationary timing marks along the time-base traces.

While the invention has been described in its particular application to navigation apparatus for use with mobile craft, it will be apparent that it has application generally to cathode ray oscillograph technique where detailed investigation of a chosen portion of a time-base display is desired.

I claim:

1. A cathode ray oscillograph device comprising means for producing a first repetitive time-base, means for generating at least two marking signals at the end of separately adjustable intervals of time after the instant which marks the commencement of a scan of said time-base, means for utilising each of said marking signals to produce visible marking indications each separately adjustable in position along the length of said scan and means for generating at least two further time bases each operating at a higher scanning speed than said first mentioned time-base and each commencing respectively in synchronism with a separate one of said marking signals.

2. A cathode ray oscillograph device comprising a single cathode ray tube, means for producing a repetitive time base deflection of the beam of said tube at a first scanning speed, means for generating a marking signal at the end of an adjustable interval of time after the instant which marks the commencement of each scan of said time base, means for utilising said marking signals to produce a visible marking indication adjustable in position along the length of said scan and means for altering the characteristics of said time-base producing means whereby it produces a repetitive time-base operating at a higher scanning speed than said first mentioned scanning speed and commencing its scanning movements from a chosen zero reference position, each scan thereof occurring in synchronism with the time of occurence of said marking signals.

3. A cathode ray oscillograph device comprising means for producing a first repetitive time-base trace for displaying a repetitive applied signal waveform, means for generating at least two marking signals at the end of separately adjustable intervals of time after the instants which mark the commencement of each scan of said first time-base, means for utilising each of the series of said marking signals for producing separate visible marking indications each independently adjustable in position along the length of said first time-base scans, means for producing at least two further repetitive time bases each operating at a common scanning speed which is higher than and subject to the same applied signal wave form as said first mentioned time-base and means for utilising each of said marking signals to control respectively the instant of commencement of one of said higher speed time-base scans whereby they provide respectively a display to a magnified scale of that portion of the first mentioned time-base scans indicated by the related marking indication.

4. A cathode ray oscillograph device comprising a single cathode ray tube, means for producing a first repetitive time-base deflection of the beam of said tube, means for generating at least two marking signals at the end of separately adjustable intervals of time after the instants which mark the commencement of each scan of said first time-base, means for utilising each of said marking signals for producing separate visible marking indications each independently adjustable in position along the length of said first time-base scans, means for producing at least two further repetitive time-bases each operating at a common scanning speed which is higher than and which replaces said first mentioned time-base and means for utilising each of said marking signals to control respectively the instant of commencement of one of said higher speed time-base scans whereby they provide respectively an alternative display at a magnified scale at that portion of the first mentioned time-base scans indicated by the related marking indication.

5. A cathode ray oscillograph device comprising a single cathode ray tube, means for producing a repetitive time-base deflection of the beam of said tube at a first scanning speed, means for generating two separate marking signals at the end of separately adjustable intervals of time after the instants which mark the commencement of each scan of said first time-base, means for utilising said marking signals for producing two separate visible marking indications each independently adjustable in position along the length of said first time-base scans, means for altering the characteristics of said time base producing means whereby it provides time-base scans operating at a higher scanning speed than said first mentioned time-base, means for utilising said marking signals to control the instant of commencement of said higher speed scans and means for spacially separating the higher-speed scans controlled by one of said marking signals from those controlled by the other marking signal so as to provide a side-by-side display to a magnified scale of those portions of the first mentioned time-base scans which are indicated by said marking indications.

6. A cathode ray oscillograph device comprising means for producing a first repetitive time-base for displaying a repetitive applied signal input at the device, means for generating at least two pulse-form marking signals at the end of separately adjustable intervals of time after the instants which mark the commencement of each of the scans of said first time-base, means for applying the separate series of said marking signals to the cathode ray tube of said oscillograph device to produce visible marking indications each independently adjustable in position along said first time-base, means for producing at least two further time-bases each operating at a scanning speed which is higher than said first time-base, means for applying said separate series of marking signals to control said further time-base producing means whereby the scans thereof each commence at a time coincident with that of the beginning of one of said marking signals, means for spacially separating the further time-base scans controlled by one series of marking signals from the further time-base scans controlled by the other series of marking signals and means for applying the repetitive applied signal input to cause the separate display of that portion of the information conveyed thereby which is coincident in time with each of said series of marking signals on said higher speed time-bases.

7. A cathode ray oscillograph device comprising a cathode ray tube having a fluorescent screen, means for producing a repetitive time-base for displaying a repetitive applied signal input, means for providing a series of timing signals occurring at pre-determined instants after the commencement of each scan of said repetitive time-base and in locked timing relationship to the instant which marks the commencement of each of said scans, means for applying said timing signals to the cathode ray tube to cause visible timing markings on said time-base scans, means for generating at least two marking signal pulses at the end of separately adjustable intervals of time after the instant of commencement of each scan of said time-base, means for applying the separate series of said marking signal pulses to said cathode ray tube to produce visible marking indications each independently adjustable in position along said time-base scans, means for producing at least two further time-bases operating at a higher scanning speed than said first time-base, means for applying the separate series of said marking signals to control said further time-base producing means to cause the latter to commence each of its scanning operations at a time coincident with that of one of said marking signals, means for spacially separating the further time-base scans controlled by one of said series of marking signals from those controlled by the other series of marking signals, means for applying the repetitive applied signal input to cause the respective display thereof by said further time-bases of those portions of the first time-base scans which are marked by said separate marking signals and means for applying said timing signals also for display by said further time bases.

8. A cathode ray oscillograph device comprising a single cathode ray tube, having a fluorescent screen, means for producing a repetitive linear time-base deflection of the beam of said tube, means for applying a repetitive signal input to cause deflection of the tube beam at right angles to the time-base scanning direction, means for producing a plurality of pulsed-form timing signals occurring at predetermined instants after the commencement of each scan of said time-base and in locked timing relationship to such commencement, means for applying said timing signals to cause intensification of the tube beam for display on said time base in addition to the applied signal input, means for generating a pulse-form marking signal at the end of an adjustable interval of time after the instants which mark the commencements of each of the scans of said time-base, means for producing as an alternative to said first time-base, a further linear time-base deflection of said tube beam at a scanning speed which is higher than that of said first time-base deflection, means for applying each of said marking signals to cause an intensification of said tube beam so as to provide a display indication adjustable in position along said first time-base and means for controlling the operation of said further time-base by said marking signals to cause said further time-base to commence operation at a time coincident with that of the occurrence of the related control marking signal and means for applying said repetitive signal input and said timing signals for display by said further time-base.

9. A cathode ray oscillograph device for displaying a repetitive applied input-waveform comprising a cathode ray tube, time base generating means for causing a repetitive scanning motion of the tube beam, said time-base generating means being controlled as to the commencement of each of its scanning cycles by the application thereto of a controlling signal and being provided with means whereby the scanning speed imparted to the tube beam thereby may be at either a lower or a higher value, a stable frequency oscillation generator, means for deriving from the output of said oscillation generator a pulsed control waveform whose frequency is of the same order as that of the repetition frequency of the applied input-waveform, means for applying said control waveform to said time-base generating means when in its lower scanning speed condition for controlling the scanning cycles thereof so as to provide a time-base for displaying a major part of the repetitive input-waveform, means controlled by said control waveform for generating a further pulsed waveform whose component pulses each occur at the end of a predetermined and adjustable time interval after the related pulse of said control waveform, means for applying said further pulsed waveform to said cathode ray tube so as to provide a marking indication adjustable in position along the length of said lower speed time-base scans and means for applying said further pulsed waveform to said time-base generating means when in its higher scanning speed condition so as to provide an alternative higher speed time-base for displaying that part of the repetitive input-waveform which is indicated by said marking indication on the lower speed time-base.

10. A cathode ray oscillograph device for displaying a repetitive applied signal comprising a cathode ray tube, time-base generating means for causing a repetitive linear scanning motion of the tube beam, said time-base generating means being controlled as to the commencement of each scanning cycle thereof by the application thereto of a controlling pulse signal and being provided with means whereby the scanning speed imparted to the tube beam may be at either a lower or a higher value, an adjustable frequency oscillation generator, means for deriving from the output of said oscillation generator a pulse controlled waveform whose frequency may be adjustable to coincide with that of the repetition frequency of the applied input signal, means for applying said control waveform to said time-base generating means when the latter is in its lower scanning speed condition so as to provide a time-base for displaying a major part of each cycle of the repetitive applied signal, means controlled by said control waveform for generating a further pulsed waveform whose component pulses each occur at the end of a predetermined and adjustable interval of time after the related pulse of said control waveform, means for applying said further pulse waveform to an electrode of said cathode ray tube so as to cause an intensification of the tube beam during the time of each pulse thereof and thereby to provide a brightened marking indication adjustable in position along the length of said lower speed time-base scans and means for applying said further pulsed waveform to said time-base generating means when the latter is in its higher scanning speed condition so as to provide an alternative higher speed time-base for displaying to a magnified timing scale that part of the applied input signal waveform which is indicated by the brightened marking indication on said lower speed time-base.

11. A cathode ray oscillograph device for displaying a repetitive applied input-waveform comprising a cathode ray tube, time-base generating means for causing a repetitive scanning motion of the tube beam, said time-base generating means being controlled as to the commencement of each of its scanning cycles by the application thereto of a controlling signal and being provided with means whereby the scanning speed imparted to the tube beam thereby may be at either a lower or a higher value, a stable frequency oscillation generator, means for deriving from the output of said oscillation generator a pulsed control waveform whose frequency is of the same order as that of the repetition frequency of the applied input-waveform, means for applying said control waveform to said time-base generating means when in its lower scanning speed condition for controlling the scanning cycles thereof so as to provide a time-base for displaying a major part of the repetitive input-waveform, means for deriving a series of timing signals occurring at predetermined instants after each pulse of said control waveform, means for applying said series of timing signals to the cathode ray tube to cause the display of timing marks on said time-base scans, means controlled by said control waveform for generating a further pulsed waveform whose component pulses each occur at the end of a predetermined and adjustable time interval after the related pulse of said control waveform, means for applying said further pulsed waveform to said cathode ray tube so as to provide a marking indication adjustable in position along the length of said lower speed time-base scans and means for applying said further pulsed waveform to said time-base generating means when in its higher scanning speed condition so as to provide an alternative higher speed time-base for displaying that part of the repetitive input-waveform and the associated timing marks which are indicated by said marking indication on the lower speed time-base.

12. A cathode ray oscillograph device for displaying a repetitive applied signal comprising a cathode ray tube, time-base generating means for causing a repetitive linear scanning motion of the tube beam, said time-base generating means being controlled as to the commencement of each scanning cycle thereof by the application thereto of a controlling pulse signal and being provided with means whereby the scanning speed imparted to the tube beam may be at either a lower or a higher value, an adjustable frequency oscillation generator means for deriving from the output of said oscillation generator a pulse controlled wave-form whose frequency may be adjustable to coincide with that of the repetition frequency of the applied input signal, means for applying said control waveform to said time-base generating means when the latter is in its lower scanning speed condition so as to provide a time-base for displaying a major part of each cycle of the repetitive applied signal, means for deriving a series of timing signals occurring at predetermined instants after each pulse of said control waveform, means for applying said series of timing marks to the cathode ray tube to cause momentary intensification of the tube beam to provide a series of brightened timing marks on said time-base scans, means controlled by said control waveform for generating a further pulsed waveform whose component pulses each occur at the end of a predetermined and adjustable interval of time after the related pulse of said control waveform, means for applying said further pulse waveform to an electrode of said cathode ray tube so as to cause an intensification of the tube beam during the time of each pulse thereof and thereby to provide a brightened marking indication adjustable in position along the length of said lower speed time-base scans and means for applying said further pulsed waveform to said time-base generating means when the latter is in its higher scanning speed condition so as to provide an alternative higher speed time-base for displaying to a magnified timing scale that part of the applied input signal waveform and the associated timing marks which are indicated by the brightened marking indication on said lower speed time-base.

13. A cathode ray oscillograph device as recited in claim 9 in which means are provided for varying the time duration of each of the pulses of said pulsed control waveform.

14. A cathode ray oscillograph device as recited in claim 10 in which means are provided for varying the time duration of each of the pulses of said pulsed control waveform.

ROBERT JAMES DIPPY.

REFERENCES CITED

The following references are of record in the file of this patent:

UNITED STATES PATENTS

| Number | Name | Date |
| --- | --- | --- |
| 2,178,074 | Jakel | Oct. 31, 1939 |
| 2,355,363 | Christaldi | Aug. 8, 1944 |
| 2,403,278 | Hershberger | July 2, 1946 |
| 2,454,782 | De Rosa | Nov. 30, 1948 |